United States Patent [19]

Forster et al.

[11] Patent Number: 4,837,437

[45] Date of Patent: Jun. 6, 1989

[54] METHOD AND CIRCUIT ARRANGEMENT FOR REDUCING THE BACKGROUND COUNT IN RADIOACTIVITY MEASUREMENTS WITH A COINCIDENCE-ANTICOINCIDENCE EVALUATION

[75] Inventors: Markus Forster, Neufahrn; Peter Maier, Munich; Harald Gaudlitz, Unterschleissheim; Richard Hefka, Eching, all of Fed. Rep. of Germany

[73] Assignee: Gesellschaft für Strahlen-und Umweltforschung GmbH, Neuherberg, Fed. Rep. of Germany

[21] Appl. No.: 114,237

[22] Filed: Oct. 19, 1987

[30] Foreign Application Priority Data

Oct. 18, 1986 [DE] Fed. Rep. of Germany ....... 3635477

[51] Int. Cl.$^4$ .............................................. G01T 1/164
[52] U.S. Cl. ............................. 250/336.1; 250/363.01; 250/369
[58] Field of Search .................. 250/369, 366, 363 R, 250/362, 361 R, 252.1 R, 328, 336.1, 363.01

[56] References Cited

U.S. PATENT DOCUMENTS 4,651,006  3/1987  Valenta ............................. 250/362

FOREIGN PATENT DOCUMENTS 113173  6/1985  Japan ............................. 250/369

OTHER PUBLICATIONS

H. H. Loosli et al., "BACKGROUND MEASUREMENTS WITH DIFFERENT SHIELDING AND ANTICOINCIDENCE SYSTEMS", *Radiocarbon*, vol. 28, No. 2A, (1986), pp. 615-622.

*Primary Examiner*—Janice A. Howell
*Assistant Examiner*—Constantine Hannaher
*Attorney, Agent, or Firm*—Spencer & Frank

[57] ABSTRACT

A method for reducing the background count rate in radioactivity measurements with a coincidence-anticoincidence evaluation, in which pulses from a detector and pulses from a shield counter device are amplified and compared based on a time relationship, reduces the zero sample counter rate of the detector by supplying the amplified pulses to analog/digital converters which convert the pulses to digital values at a predetermined clock frequency. When a detection pulse is identified, digital values are transferred to a PC system. In the PC system the height, shape, or slope of the detector pulses is compared to the height, shape, or slope of any contemporaneous pulse from the shield counter device. Circuitry for performing the method is also disclosed.

12 Claims, 6 Drawing Sheets

METHOD AND CIRCUIT ARRANGEMENT FOR REDUCING THE BACKGROUND COUNT IN RADIOACTIVITY MEASUREMENTS WITH A COINCIDENCE-ANTICOINCIDENCE EVALUATION

BACKGROUND OF THE INVENTION

The invention relates to a method for reducing the background count rate in radioactivity measurements which are evaluated using coincidence-anticoincidence techniques, in which pulses from a sample detector and pulses from a guard or shield counter are amplified and compared based on a time relationship in order to identify pulses of interest. The invention also relates to a circuit arrangement for performing the method.

In practice, problems exist when measuring very low activities of radiological substances, for example the hydrologically important classification of ground water by age, which in the range between approximately 100 and 1500 years can be done only by determining the $Ar^{39}$ activity in the gas dissolved in the ground water. In recent waters (surface waters), there is an $Ar^{39}$ content in the gas dissolved in the water of 0.11 dpm per liter of argon. For approximately 1000-year-old water, this drops in accordance with the half-life of (269 years) to approximately 0.008 dpm $Ar^{39}$ per liter of argon.

For great constancy in the resulting count-rate, counting times of up to 10,000 minutes (that is, almost a week) for one sample are required, and the background radioactivity sensed by the measuring system must be very low. It will be apparent that these conditions place severe demands on the counter arrangement that is employed.

Efficient measurement of the $Ar^{39}$ contents in the prepared argon can be done via a counter tube (e.g., a Geiger-Müller tube) as a sample detector. This counter tube is filled with prepared argon, with an admixture of $CH_4$ as a quenching gas. The $Ar^{39}$ activity of the argon in the counter tube is picked up as a pulse rate and compared with the count rate of argon that is free of $Ar^{39}$ (zero sample). The information gained from initial zero sample measurements obtained during a measurement comparison has been reported in an article by Loosli, Forster and Otlet, "Background Measurements with Different Shielding and Anticoincidence Systems," *Radiocarbon*, volume 28, number 2A, Trontheim, (1986) pages 615–622. For operation of an $Ar^{39}$ measuring arrangement in a near-surface laboratory, it is worthwhile not only to provide active shielding (as will be discussed) of the sample counter tube with a surrounding plastic scintillator, but also to effect a further reduction in the zero sample count rate. In initial measurements, it has been possible to accomplish this at present with an additional passive shield of lead surrounding the counter tube. This leads to the conclusion that part of the contributing zero effect can be ascribed to environmental gamma radiation not actively detected by the plastic scintillation counter.

This non-detected gamma radiation can derive from the residual activity of the materials used, but can also be generated in the material surrounding the counter tube, for example by cosmic muons.

As was discussed above the count attributable to background radiation can be reduced but not eliminated entirely by placing the counter tube which contains the $Ar^{39}$ sample inside a passive shield, such as a lead enclosure. However the $Ar^{39}$ sample is a feeble radioactive source, and further steps are desirable to ensure that the count attributable to decay of the $Ar^{39}$ is not overwhelmed by the count attributable to the residual background radiation. For this purpose the well known coincidence-anticoincidence evaluation technique may be employed to provide what may be deemed an active shield inside the passive shield. To this end an additional radiation detector such as plastic scintillation counter is placed around the counter tube as a guard or shield counter. The arrangement is such that most background radiation rays which pass through the counter tube must also pass through the scintillation counter, so that a pulse from the counter tube can be attributed to the background radiation if it is accompanied by a pulse from the scintillation counter (that is, the pulses are coincident). On the other hand $Ar^{39}$ decays by emitting a beta particle, which is detected by the counter tube but which is not sufficiently energetic to penetrate into the scintillation counter. Consequently a pulse from the counter tube which is not accompanied by a pulse from the scintillation counter (that is, the pulses are anticoincident) is attributable to decay of an $Ar^{39}$ nucleus. Of course anticoincidence also arises if the scintillation counter emits a pulse and the counter tube does not, as when a background radiation ray traverses the scintillation counter and misses the counter tube, but this case can be ignored. In short the scintillation counter provides an active shield not in the sense of blocking residual background radiation within the passive shield, but in the sense of signalling moments of background activity so that pulses from the counter tube during these moments can be ignored.

Figure 1:
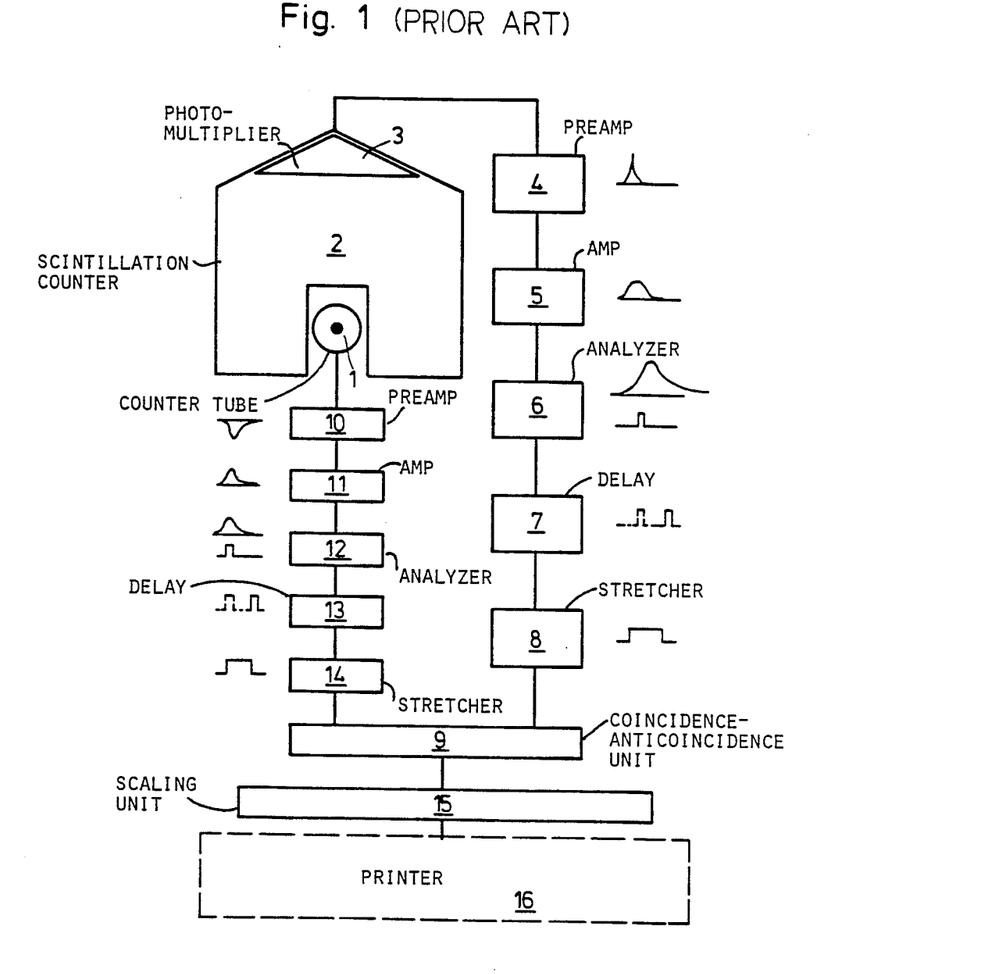
FIG. 1 illustrates a prior art system for measuring radioactivity with a coincidence-anticoincidence evaluation.

The measuring method usually used can be explained in principle, for better comprehension of the problems involved, by referring to FIG. 1. FIG. 1 shows an anticoincidence measuring arrangement with conventional electronic components. In FIG. 1 characteristic output waveforms for various components are illustrated beside the respective component (or, where two waveforms are illustrated beside a component, both an intermediate waveform and the output waveform). The measuring system comprises a sample detector such as counter tube 1, into which the sample was pinched off, and a shield counter such as plastic scintillation counter 2 surrounding the counter tube 1, which is connected in anticoincidence with the counter tube 1. A passive shield (not illustrated) of lead surrounds counter tube 1 and scintillation counter 2.

Pulses from a photomultiplier 3 are temporally stretched and amplified by a preamplifier 4 and a main amplifier 5. If the pulse following the main amplifier 5 exceeds an adjustable voltage threshold, then a TTL standard signal of 5 volts in height and 500 nsec in length is emitted by a single-channel analyzer 6. Since with temporally coincident events the counter tube 1 responds more slowly than the scintillation counter 2, the signal from the scintillation counter must be correspondingly temporally delayed. This is done in the delay unit 7. Depending on the type of particle detected (ionization capacity, speed, and range), the signal from the scintillation counter is subjected to a time fluctuation in the $\mu s$ range. In order to attain a reliable voltage of a coincident counter tube pulse even with temporal migration of the signal from the scintillation counter, the standardized and then delayed TTL pulse of 50 $\mu s$ stretched to 150 $\mu s$ (stretch unit 8), before it is passed on to the coincidence-anticoincidence unit 9.

Analogously to the electronics of the plastic scintillation counter 2, a counter event detected by the counter tube 1 is also initially preamplified (10). Because of how the high counter tube voltage is typically connected, the signal must be inverted prior to the main amplification 11. The ensuing steps in the single-channel analyzer 12, in the delay unit 13, and in the stretch unit 14 take a similar course to that for the signal from the scintillation counter, except that for the counter tube 1 a stretch to approximately 40 to 50 μs is performed, in order to suppress any possible afterpulses of one counting event. In the coincidence-anticoincidence unit 9, a comparison of the scintillation counter and counter tube event takes place in accordance with their time relationship. If the scintillation counter signal and the counter tube signal are simultaneous within 150 μs, then the counter tube event is summed up as "coincident." Analogously, a counter tube event is summed up as "anticoincident" if it does not have any accompanying pulse from the scintillation counter. Via the scaling unit 15, a new measurement cycle is started, after which the results are output to a printer 16.

SUMMARY OF THE INVENTION

Given this state of the art, it is the object of the invention to improve the method of the type described above such that a further reduction of the zero sample count rate of the detector becomes possible by faster and better processing of the pulses.

This object is attained by amplifying pulses from the sample or primary detector and the shield counter; supplying the amplified pulses to digitalizer, which repeatedly converts them into digital values at a predetermined clock frequency; transferring a series of values corresponding to the primary detector pulses to a PC system; and in the PC system, performing a discrimination among the stored detector pulses that is oriented to the type (that is, coincident or anticoincident), shape, or slope and height of the detector pulse.

The pulses of the sample detector (e.g., counter tube 1) and shield counter (e.g., scintillation counter 2) are supplied in accordance with the invention to analog/digital converters, after preamplification. The scanning speed of the converters is so high that a voltage value is converted every microsecond, for example. An adjustable threshold following the analog/digital converters serves as a trigger for the data transfer. If this threshold is exceeded, then the values digitized at intervals of 1 μs, for example, are taken over by a buffer memory. The result is a sequence of numbers of preferably 10 values each for the channels of the detector and the shield counter. The two sequences of numbers now contain data as the information of pulse height, the duration of the pulse, and the rise time to the maximum voltage. Furthermore the fall time back to e.g. half of the maximum of the maximum voltage can be calculated, and distortion in the shape of the pulses of the sample detector and the shield counter can be registered. By interrogation, for example as to whether the sum of the digitized values on the side of the shield counter is zero or not (that is, whether a pulse from the shield counter accompanies a pulse from the sample detector or not), a decision as to the presence of coincident or anticoincident events is made, as will be explained.

With the invention, rise spectra of Kr-85, Ar-37, Ar-39, and H-3 marked gases can be picked up in a proportional counter tube. By comparison with the pulse characteristics of an external gamma source (Am-241, Co-60, Cs-137), a possibility of discriminating between internal $\beta+$ and $\beta-$ and external gamma radiation is expected. From this, spectra conditions that produce a reduction in the background of the proportional counter tube used can be derived.

In the circuit arrangement according to the invention, the rise of a pulse beyond a trigger threshold triggers the processing of the real pulse.

With the circuit arrangement used according to the invention, information is present from the beginning as to the entire shape of the pulse. Depending on the evaluation program, any criterion based on shape and time can be used for the pulse. Correlations between height, shape, and duration of the pulse from the shield counter and the height, shape, and duration of pulses of the sample detector are equally possible, as is time monitoring of the "mean shape of the detector pulse," from which it becomes possible to monitor for changes in the characteristics of the counter gas used.

DESCRIPTION OF THE PREFERRED EMBODIMENT

Figure 2:
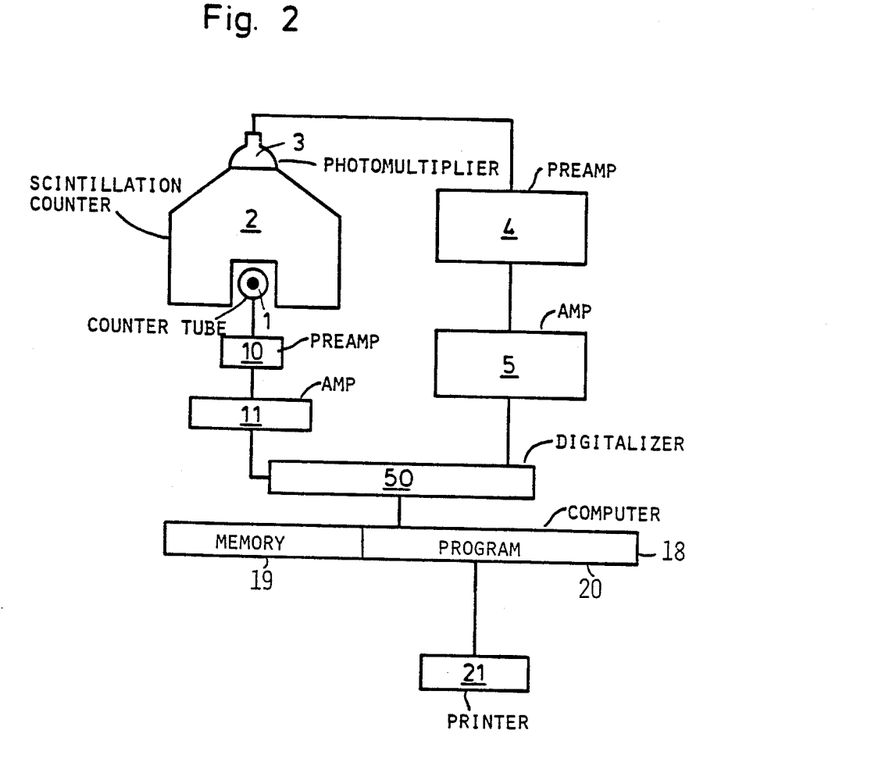
FIG. 2 illustrates a system for measuring radioactivity in accordance with the present invention, and schematically shows a system with fast analog/digital conversion and transfer of the digitized values to a PC system.

In the system according to the invention shown in FIG. 2, the conventional components illustrated in FIG. 1 are employed until amplified pulses from counter tube 1 and scintillation counter 2 are generated (reference numerals 1–5 and 10, 11). Moreover, as a result of the modification provided by the invention, it is unnecessary to use single-channel analyzers 6 or 12 (as seen in FIG. 1). Instead, the amplified pulses are provided via digitalizer 50 to a PC (personal computer) system 18. The circuitry of digitalizer 50 will be discussed in conjunction with FIGS. 3, 4, and 5.

As will be explained in more detail later, in digitalizer 50 the amplified pulses of the counter tube 1 and scintillation counter 3 are each supplied to a fast 8-bit analog/digital converter 17 (see FIG. 3), which converts them repeatedly into digital values at a clock rate of 10 MHz. If an amplified and digitized voltage value from counter tube 1 exceeds a preselected trigger threshold (in this case, the value 1), then this is interpreted as a counter tube pulse, and a series of 10 values succeeding one another at intervals of 1 μs are read into a fast buffer memory (see FIG. 5) After transferring the series of values to the PC system 18, the buffer memory again becomes free to store new events. In accordance with the problem addressed, a specifically oriented evaluation suited to the type (coincidence or anticoincidence), shape, slope, etc. of the pulse detected, becomes possible by access to the collected and stored data. In the case applicable to the invention, a precise discrimination among the stored counter tube pulses into coincident pulses $\sum_i x_i \neq 0$ and $\sum_i y_i \neq 0$ anticoincident pulses $\sum_i x_i \neq 0$ and $\sum_i y_i = 0$ (where $x_i$ represents G.M. tube pulses, generated by the sample, and where $y_i$ represents scintillation counter or shield counter pulses) is performed in accordance with the rise time, maximum, and fall time. Connected to the output of the digitizing system is a PC 18 with a large memory 19 and an evaluation program 20, and a printer 21. The memory 19 and evaluation program 20 are part of the PC system 18.

Figure 3:
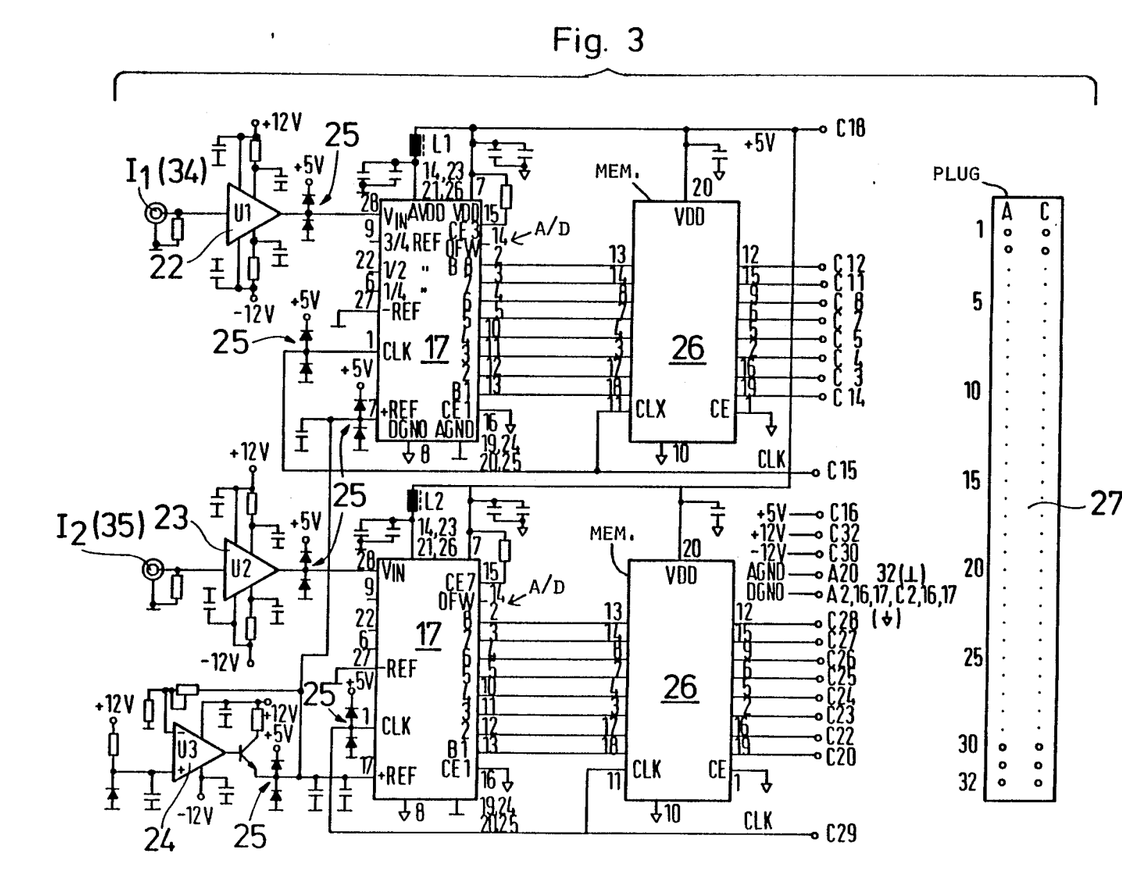
FIG. 3 shows an analog/digital converter (flash converter) having a 20 MHz maximal scanning rate.

Turning next to FIG. 3, via respective input amplifiers 22, 23 (Micro Power Systems MP 2004), the pulses $I_1$ and $I_2$ from the counter tube 1 and the scintillation counter 2 pass to 8-bit parallel analog/digital converters 17 (MP 7684). Each A/D converter 17 can process at a maximum scanning rate of 20 MHz. Each A/D converter 17 comprises 256 (zero bit included) clocked voltage comparators (not illustrated) and one decoder logic circuit (not illustrated), and must be triggered by a signal from a low impedance source. The input amplifiers 22 and 23 are therefor absolutely necessary as impedance converters. The 256 comparators are dependent on the stabilized reference voltage +REF amplified by means of the amplifier 24 (MP 4136), and the accuracy of the A/D conversion depends decisively on the stability of this voltage. The inputs $V_{IN}$, +REF, and CLK of the A/D converters 17 are threatened by "latch up" and must be protected with Schottky barrier diodes 25. The A/D converters 17 convert the analog input signals $I_2$ and $I_2$ each into one of a maximum of 256 digital values, which at the end of the conversion cycle are present at the tri-state outputs B1 through B8 of the respective A/D converter 17. The memory components 26 (SN 74374) serve to decouple the A/D converters 17 from the following stages (64-pole plug 27).

Figure 4:
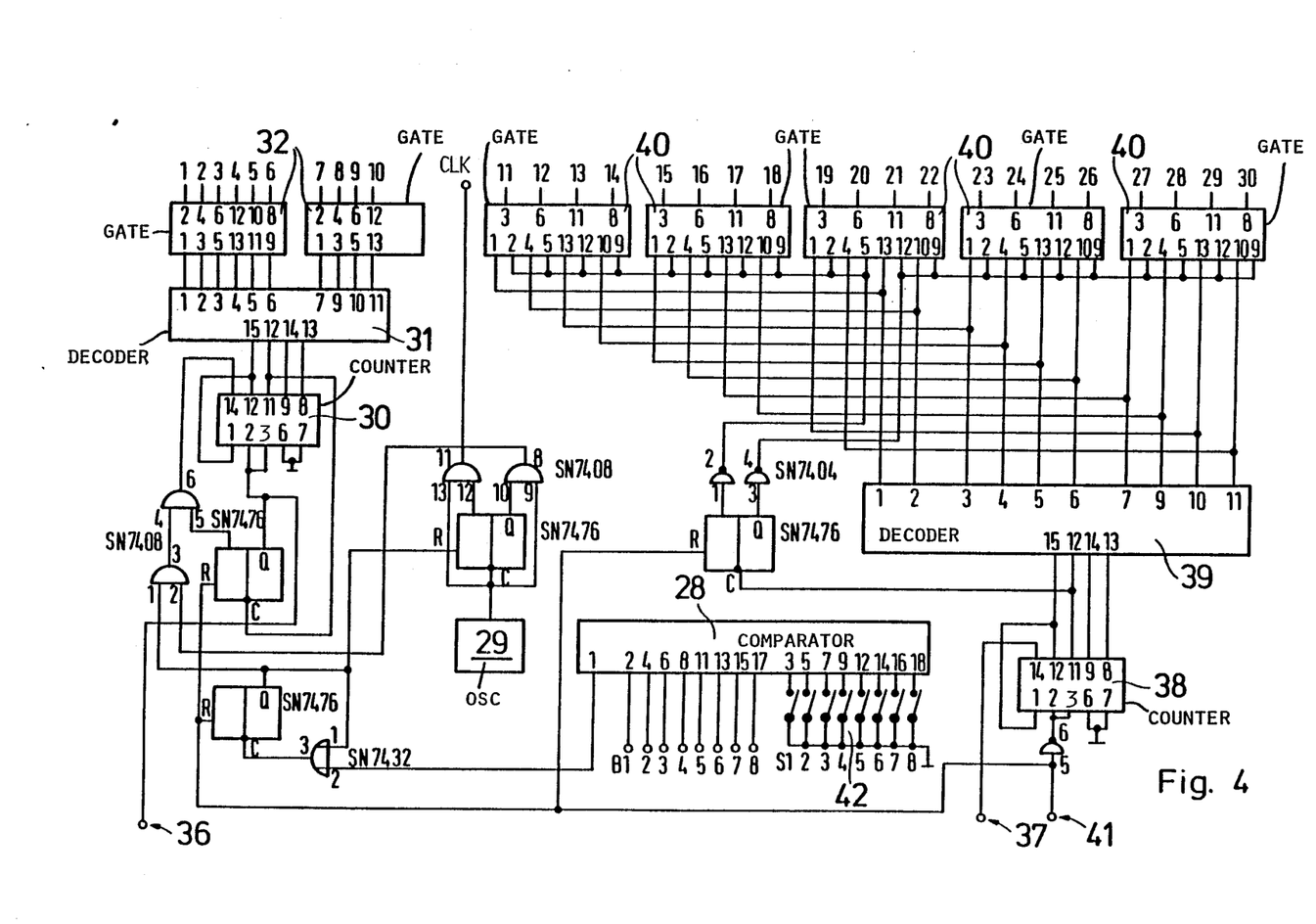
FIG. 4 shows a PC interface or flow control.
Figure 5:
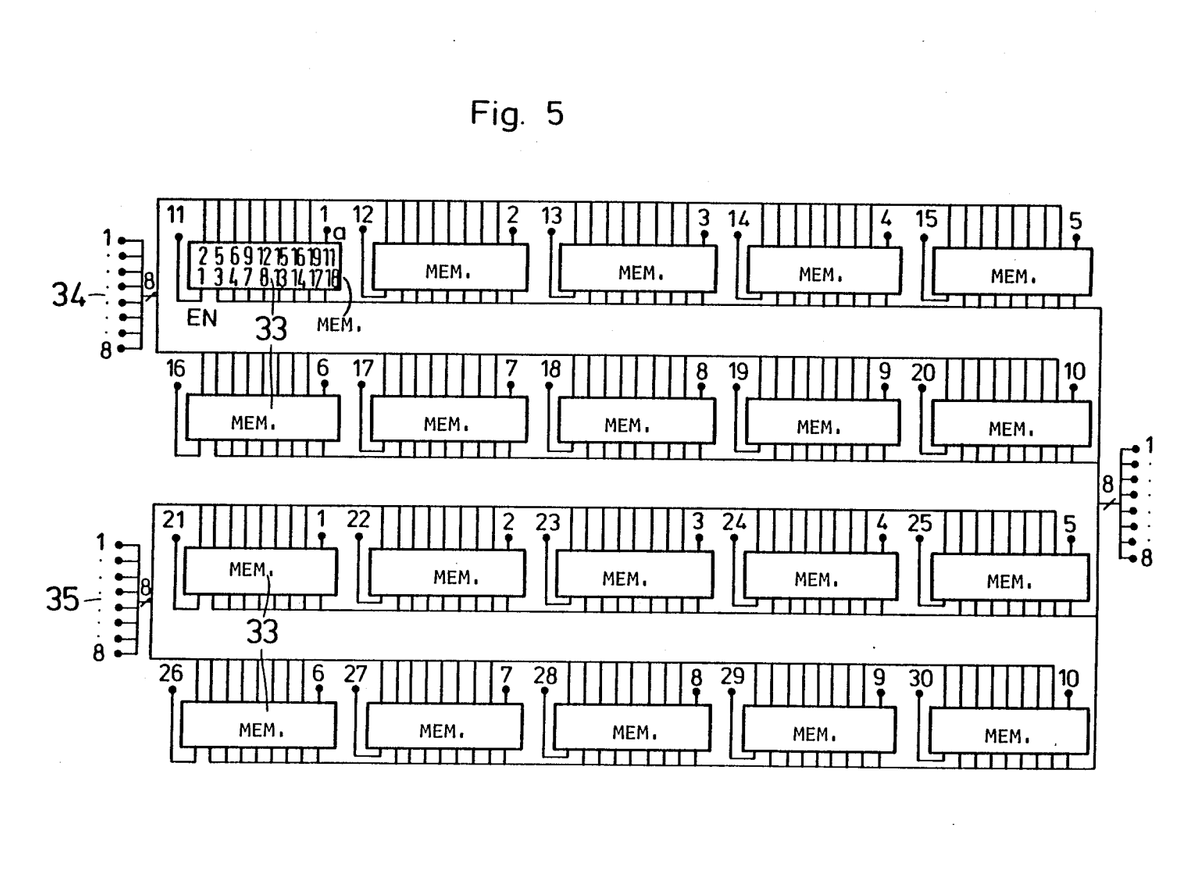
FIG. 5 shows a PC interface or memory portion.

The digital outputs of the A/D converter 17 of one channel 34 or 35 (for example, the channel 34 of the counter tube pulses $I_1$) are connected to the inputs B1-B8 of the 8-bit comparator 28 (SN 74LS682; see FIG. 4). The switches S1-S8 (reference number 42) are connected to the remaining inputs, and with these switches the digital value to be compared can be set between 1 and 255 as a trigger threshold 41. If this threshold is exceeded by the value at the inputs B1-B8, then the memory process begins. Per channel, there are 10 memory components 33 (SN 74LS374; see FIG. 5) present, each of which is capable of taking on one 8-bit word. The clock rate for this process is generated by a quartz oscillator 29. With a decimal counter 30 (N 74LS90) and a decoder 31 (SN 74LS42), ten memory pulses are generated. The 10 outputs of the decoder 31 are connected via gates 32 (74LS04) to the clock inputs of the memory components 33 (lines 1-10; see FIG. 5). The data input pins (2, 5, 6, 9, 12, 15, 16, and 19) of the 10 memory components 33 in the channel 34 portion of FIG. 5 are connected to the outputs of the memory component 26 in the channel 34 portion of FIG. 3, and similarly the data input pins of the 10 memory components 33 in the channel 35 portion of FIG. 5 are connected to the outputs of the memory component 26 in the channel 35 portion of FIG. 3. Accordingly, the measured values are simultaneously read into the memory components 33 of channel 34 and channel 35 when the ten memory pulses are generated. The memory speed is dependent on the quartz oscillator 29 used and on the threshold frequency of the integrated circuits. Once ten measured values have been read in per channel, the memory clock is blocked by means of a flip-flop, and terminal 36 changes its logical state.

This change causes the PC system 18 to read in the measured values stored in memory by way of the data output pins (3, 4, 7, 8, 13, 14, 17, 18) of the memory components 33 (pin 1 refers to "chip enable"). The clock rate required for this is emitted by the PC system 18 and via terminal 37 (FIG. 4) reaches the input of a further decimal counter 38 (SN 74LS90). Its outputs are decoded in the decoder 39 (SN 74LS42) and via gates 40 (SN74LS32, lines 11-30) control the reading inputs of the individual memory components 33. Thus each value is taken over from channel 34 and then from channel 35 by the PC system 18; that is, twenty 8-bit words are received by PC system 18. Once all the measured values have been taken over, the PC system 18 sends a reset pulse, which arrives at terminal 41.

The system described is generally suitable for low level radiological measurements and is only limited to the conversion and processing of a maximum of 1000 cpm of the sample detector. If faster components, which are available on the market, are used, then the maximum processable counting rate can be increased accordingly. From the operation of the system, it can be determined that its performance is better with respect to accurate pulse processing, and it also proves to be more economical in comparison with a conventional electronic design.

Figure 6:
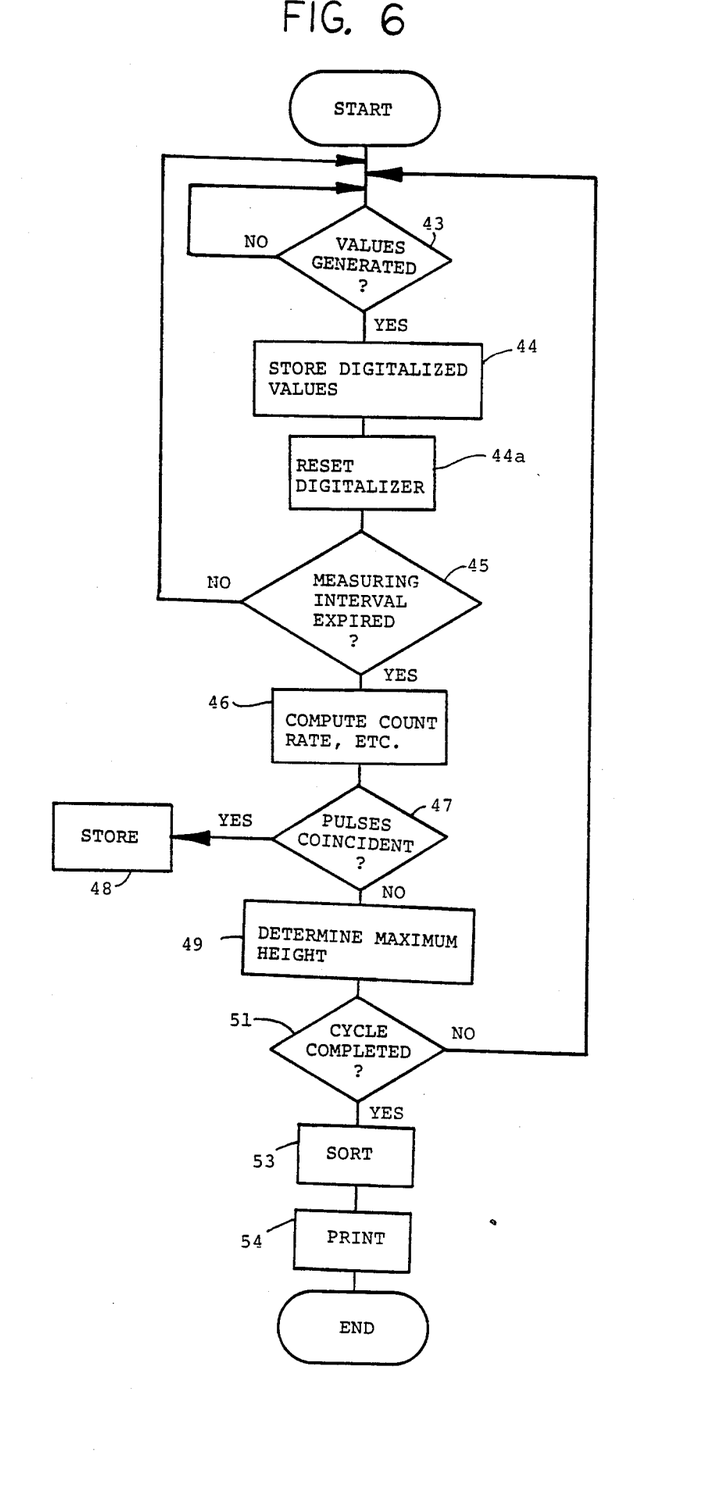
FIG. 6 shows a flow chart of the evaluation program.

FIG. 6 shows an example of a flow chart for an evaluation program 20 which can be used with the arrangement of FIG. 2. With reference to both FIGS. 2 and 6, in block 43 digitalizer 50 is monitored (by detecting the logical state of terminal 36 in FIG. 4) to determine whether memories 33 (FIG. 5) store digitalized values. If YES, the digitalized values are stored (block 44) in memory 19. That is, digital values for both $x_i$ (i=1, ..., 10), corresponding to the amplified output of counter tube 1, and $y_i$ (i=1, ..., 10), corresponding to the amplified output of scintillation counter 2, are stored. Thereafter, in block 44a digitalizer 50 is reset by applying a pulse to terminal 41 (FIG. 4). In block 45 a check is made to determine whether a first measuring interval (100 minutes, for example) has expired or not. If not, the program returns to block 43 so that any further pulses which are detected during the first measuring interval will be digitalized and stored.

If the first measuring interval has been completed, in block 46 values such as the count rate (cpm) and standard deviation (using the 2 $\sigma$ criterion, for example) are computed. Thereafter a check is made at block 47 to detect coincident pulses. For example, if the sum of the ten values $x_i$ that were read in during a single storage operation (block 44) is unequal to zero, and the sum of the ten values $y_i$ that were read in during the same storage operation is also unequal to zero, the pulses are judged to be coincident. In block 48, the number of coincident pulses detected during the measuring interval is stored. On the other hand if the sum of the ten values $x_i$ that were read in during a single storage operation is unequal to zero while the sum of the corresponding ten values $y_i$ is equal to zero, counter tube 1 has received an anticoincident pulse. For each of these anticoincident pulses, in block 49 the maximum pulse height is determined (that is, the maximum of the ten values $x_i$ selected). These values are stored.

In block 51 a check is made to determine whether an entire cycle of measuring intervals (for example 10 measuring intervals, of 100 minutes each) has been completed. If not the program returns to block 43. If the entire cycle has been completed, however, in block 53 the stored maxima of the anticoincident pulses are sorted with respect to their heights to generate a multi-channel-analyzer spectrum. This spectrum, along with the results of the calculations in block 46, is provided as output on printer 21 during block 54.

It will be understood that the above description of the present invention is susceptible to various modifications, changes and adaptations, and the same are intended to be comprehended within the meaning and range of equivalents of the appended claims.

We claim:

1. A method for reducing the background count rate in a measurement with a coincidence-anticoincidence evaluation, in which pulses from a detector and pulses from a shield counter adjacent the detector are compared based upon a time relationship, comprising the steps of:
   (a) amplifying the pulses from the detector and the shield counter;
   (b) repeatedly converting the amplified pulses to digital values at a predetermined clock frequency to provide digitalized pulses;
   (c) identifying a series of digital values corresponding to a digitalized pulse from the detector;
   (d) transferring to a computer the digitalized pulse from the detector identified in step (c) along with any concurrent digitalized pulse from the shield counter; and
   (e) in the computer, comparing a characteristic of the digitalized pulse from the detector which was transferred in step (d) with a corresponding characteristic of any digitalized pulse from the shield counter that was transferred in step (d),
   wherein pulses from the detector are conveyed to the computer via a detector channel having a digital portion, and wherein step (c) includes monitoring the digital portion of the detector channel to detect a digital voltage value which exceeds a trigger threshold.

2. The method of claim 1, wherein the characteristic compared in step (e) is a characteristic selected from the group consisting of pulse type (coincident or anticoincident), pulse shape, and pulse slope.

3. The method of claim 1, further comprising the step of exposing the detector to a sample having isotopes selected from the group consisting of $H^3$, $C^{14}$, $Ar^{39}$, and $Kr^{85}$.

4. A circuit arrangement for reducing the background count rate in a measurement with a coincidence-anticoincidence evaluation, comprising:
   a detector which generates detector pulses;
   a shield counter which generates shield counter pulses;
   first means for amplifying pulses from the detector and the shield counter;
   second means for converting the amplified pulses to digital values at a predetermined frequency to provide digitalized pulses, the second means including an 8-bit parallel analog/digital converter to receive the amplified detector pulses and an 8-bit parallel analog/digital converter to receive the amplified shield counter pulses;
   third means for identifying a series of digital values corresponding to a digitalized pulse from the detector, the third means including an 8-bit comparator having an input connected to the output of the analog/digital converter which receives the amplified detector pulses; and
   fourth means for transferring to a computer the digitalized pulse identified by the third means along with any concurrent digitalized pulse from the shield counter,
   wherein the computer comprises means for comparing a characteristic of the digitalized pulse from the detector which was transferred by the fourth means with a corresponding characteristic of any digitalized pulse from the shield counter that was transferred by the fourth means.

5. The circuit arrangement of claim 4, wherein the characteristic compared by the computer is a characteristic selected from the group consisting of pulse type, pulse shape, and pulse slope.

6. The circuit arrangement of claim 4, wherein each of the analog/digital converters includes a plurality of comparators, and wherein the second means further comprises an amplifier connected as an impedance converter between the first means and the input of one of the analog/digital converters, another amplifier connected as an impedance converter between the first means and the input of the other analog/digital converter, and means for generating a stabilized reference voltage for the comparators of the analog/digital converters.

7. The circuit arrangement of claim 4, wherein the second means further comprises:
   a plurality of memory components to store the output of one of the analog/digital converters and a plurality of memory components to store the output of the other analog/digital converter, each memory component having a storage capacity of one 8-bit word and having a clock terminal;
   an oscillator; and
   fifth means connecting the oscillator to the clock terminals of the memory components for generating memory pulses to control storage in the memory components, the fifth means including a counter and a decoder connected to the counter.

8. The circuit arrangement of claim 7, wherein the fourth means comprises means connected to the counter for conveying a signal to the computer to cause the computer to read the values stored in the memory components.

9. The circuit arrangement of claim 4, further comprising a sample to which the detector is exposed, the sample having isotopes selected from the group consisting of $H^3$, $C^{14}$, $Ar^{39}$, and $Kr^{85}$.

10. A method for use with a radiation measuring apparatus which includes a detector and a shield counter adjacent the detector to reduce the background count rate, said method comprising the steps of:
   (a) repeatedly converting analog pulses from the detector and shield counter to digitalized values at a predetermined clock frequency, each analog pulse corresponding to a respective series of digitalized values;
   (b) detecting when a digitalized value exceeds a predetermined trigger threshold, the following series of digitalized values representing one analog pulse;

(c) transferring a series of digitalized values derived from the detector and a series of digitalized values derived from the shield counter to a computer when a digitalized value exceeding the trigger threshold is detected in step (b), the transfer being conducted via a buffer memory; and (d) in the computer, conducting a coincidence-anticoincidence evaluation using the digitalized values transferred in step (c).

11. The method of claim 10, wherein step (d) comprises comparing at least one of the pulse height, pulse rise time, pulse shape, and pulse slope of digitalized pulses derived from the detector and the shield counter.

12. The method of claim 11, wherein step (d) further comprises comparing the time relationship of the digitalized pulses.

* * * * *